(12) United States Patent
Hilbig et al.

(10) Patent No.: US 10,393,399 B2
(45) Date of Patent: Aug. 27, 2019

(54) TARGETED CLEAN AIR DELIVERY

(71) Applicant: KONINKLIJKE PHILIPS N.V., Eindhoven (NL)

(72) Inventors: Rainer Hilbig, Eindhoven (NL); Jun Shi, Eindhoven (NL); Achim Gerhard Rolf Koerber, Eindhoven (NL); Michael Martin Scheja, Eindhoven (NL); Jan Frederik Suijver, Eindhoven (NL); Peter Hermanus Bouma, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/077,121

(22) PCT Filed: Jul. 10, 2017

(86) PCT No.: PCT/EP2017/067207
§ 371 (c)(1),
(2) Date: Aug. 10, 2018

(87) PCT Pub. No.: WO2018/011115
PCT Pub. Date: Jan. 18, 2018

(65) Prior Publication Data
US 2019/0128553 A1 May 2, 2019

(30) Foreign Application Priority Data

Jul. 15, 2016 (WO) ................ PCT/CN2016/090154
Sep. 19, 2016 (EP) ..................................... 16189388

(51) Int. Cl.
*F24F 11/79* (2018.01)
*F24F 3/16* (2006.01)
(Continued)

(52) U.S. Cl.
CPC ................ *F24F 11/79* (2018.01); *F24F 1/00* (2013.01); *F24F 3/1607* (2013.01); *F24F 11/30* (2018.01);
(Continued)

(58) Field of Classification Search
CPC .... F24F 1/00; F24F 11/77; F24F 11/79; F24F 2120/12; F24F 2120/14; F24F 2221/38
(Continued)

(56) References Cited

U.S. PATENT DOCUMENTS 3,745,991 A * 7/1973 Gauthier ........... A61M 15/0086
128/205.29
6,468,222 B1 10/2002 Mault
(Continued)

FOREIGN PATENT DOCUMENTS

CN 104806541 A 7/2015
EP 1944036 A2 7/2008
(Continued)

OTHER PUBLICATIONS

Ole Fanger P: "Human requirements in future air-conditioned environments", International Journal of Refrigerati on, Elsevier, Paris, FR, vol. 24, No. 2, Mar. 1, 2001 (Mar. 1, 2001), Jan. 19, 2000 (Jan. 19, 2000), pp. 148-153, XP004287419, ISSN: 0140-7007, DOI: 10.1016/S0140-7007(00) 00011-6 p. 151, paragraph 5—p. 1525.
(Continued)

*Primary Examiner* — Steven B McAllister
*Assistant Examiner* — Allen R Schult

(57) ABSTRACT

Disclosed is an air purification system (10) including an air purification apparatus (100) comprising an air inlet (112); an air outlet (114) for expelling air in a target direction (116) into a region and including an adjustment mechanism (121) arranged to adjust said target direction in response to a target
(Continued)

direction adjustment signal from a control system for aiming the air outlet at the face of a person in said region; at least one pollutant removal structure (101) in between the air inlet and the air outlet; and an air displacement apparatus (113) for displacing air from the air inlet to the air outlet through the at least one pollutant removal structure, and a sensor (151, 160, 135) adapted to determine a breathing parameter of the person, wherein the air purification apparatus is configured to expel said air as a function of said breathing parameter. A computer program product for configuring such a control system is also disclosed.

15 Claims, 16 Drawing Sheets

(51) Int. Cl.
| | | |
|---|---|---|
| *F24F 11/30* | (2018.01) | |
| *F24F 11/83* | (2018.01) | |
| *F24F 11/77* | (2018.01) | |
| *F24F 1/00* | (2019.01) | |
| *F24F 110/00* | (2018.01) | |
| *F24F 120/10* | (2018.01) | |
| *F24F 120/12* | (2018.01) | |
| *F24F 120/14* | (2018.01) | |
| *F24F 120/20* | (2018.01) | |

(52) U.S. Cl.
CPC .............. *F24F 11/77* (2018.01); *F24F 11/83* (2018.01); *F24F 2110/00* (2018.01); *F24F 2120/10* (2018.01); *F24F 2120/12* (2018.01); *F24F 2120/14* (2018.01); *F24F 2120/20* (2018.01); *F24F 2221/125* (2013.01); *F24F 2221/38* (2013.01)

(58) Field of Classification Search
USPC ......................................................... 454/229
See application file for complete search history.

(56) References Cited

U.S. PATENT DOCUMENTS

| | | | |
|---|---|---|---|
| 9,551,541 | B2 | 1/2017 | Matsumoto |
| 2004/0224628 | A1* | 11/2004 | Niu ........................ B60H 1/246 |
| | | | 454/370 |
| 2007/0244363 | A1* | 10/2007 | Sano .................. A61B 1/00039 |
| | | | 600/158 |
| 2009/0192399 | A1 | 7/2009 | Choi |
| 2011/0039491 | A1 | 2/2011 | Khalifa |

FOREIGN PATENT DOCUMENTS

| | | |
|---|---|---|
| EP | 2233071 A1 | 9/2010 |
| EP | 2687789 A1 | 1/2014 |
| JP | 2000171067 | 6/2000 |
| JP | 2009228944 | 10/2009 |
| RU | 2585520 | 5/2016 |
| WO | 2004009169 A1 | 1/2004 |
| WO | 2011042801 A1 | 4/2011 |
| WO | 2015012750 A1 | 1/2015 |

OTHER PUBLICATIONS

"World's first Breath-Synchronized Air Flow System (BSFS)" Koken Technology / Breath-Response PAPR New folder\www.koken-ltd.co.jp—ktech_brpapr-VR.pdf.
WHO Publication/Guidelines. Natural Ventilation for Infection Control in Health-Care Settings. World Health Organization 2009.

* cited by examiner

TARGETED CLEAN AIR DELIVERY

This application is the U.S. National Phase application under 35 U.S.C. § 371 of International Application No. PCT/EP2017/067207, filed on Jul. 10, 2017, which claims the benefit of International Application No. PCT/CN2016/090154 filed on Jul. 15, 2016 and International Application No. 16189388.8 filed on Sep. 19, 2016. These applications are hereby incorporated by reference herein.

FIELD OF THE INVENTION

The present invention relates to an air purification system including an air purification apparatus comprising an air inlet; an air outlet; at least one pollutant removal structure in between the air inlet and the air outlet; and an air displacement apparatus for displacing air from the air inlet to the air outlet through the at least one pollutant removal structure.

The present invention further relates to a computer program product for configuring a control system of such an air purification system.

BACKGROUND OF THE INVENTION

Air pollutants including particulate matter and gases (e.g. VOCs) are known to have a wide range of negative health effects (including respiratory and cardiovascular diseases). Substances of biological origin, when present in air, are sometimes referred to as bio-aerosols. They include microorganisms and their fragments which can be toxigenic, allergenic and/or infectious. Respiratory diseases can be transmitted by inhalation of small airborne particles containing complete infectious microorganisms such as virus or bacteria aerosolized during coughing, sneezing and talking. Microorganism fragments (e.g. endotoxins and $\beta$-(1-3)-D-glucans) or by-products (e.g. microbial volatile organic compounds and mycotoxins) can cause toxic and allergic reactions.

The concentration of such particles in indoor air can be decreased using building ventilation and/or traditional air purifiers. In both cases, the clean air coming from the fresh air supply in the case of ventilation or from the air purifier outlet is mixed with the indoor air. Therefore, the pollutant concentration generally increases with increasing distance from the air outlet. Although the concentration gradient becomes smaller the closer the system is to its equilibrium, the general problem remains and is of particular importance for pollutants which are not being continuously emitted at a constant rate but in random, distinct patterns as for instance is the case of coughing and sneezing.

WO 2011/042801 A1 discloses methods and devices whereby a controlled personal breathing zone is maintained using temperature controlled laminar air flow (TLA) of filtered air. A substantially laminar, descending flow of filtered air is maintained with a velocity determined by the air-temperature difference between the supplied air and the ambient air at the level of the personal breathing zone. The air-temperature of the filtered supply air can be carefully adjusted to maintain the velocity-determining difference in air-temperature within the optimum range of 0.3 to 1° C. However, the disclosed methods and devices assume a stationary position of the person to which the laminar, descending flow of filtered air is delivered. However, people in stationary positions, e.g. sitting behind a desk or lying in bed, tend to move around to a certain degree, which movement may reduce the effectiveness of the targeted delivery of the filtered air, as the filtered air may no longer be delivered to the adjusted position of such people. Moreover, the need to detect and maintain the temperature of the delivered air adds complexity to such devices, which may be undesirable from as cost perspective as well as in a scenario where miniaturization of the device is an objective.

EP 2 687 789 A1 discloses an indoor unit of an air conditioning apparatus capable of achieving an air conditioning environment preferred by a user without operation of a remote control. Pre-stored face recognition information and user preferences are used to recognise the face of a user with an indoor imaging device and to blow conditioned air towards the user in accordance with the pre-stored preferences of the recognised user. Movement of the user's face may be tracked and at least one of the fan, refrigeration cycle and air flow direction adjustment device of the indoor unit may be controlled to send the conditioned air towards the determined position of the user. However, the tailoring of the delivery of such conditioned air may be further improved by considering parameters in addition to the location of the user.

SUMMARY OF THE INVENTION

The present invention seeks to provide an air purification system including a compact air purification apparatus that can improve the tailoring of the delivery of clean air to a person in different locations.

The present invention further seeks to provide a computer program product for configuring a control system of such an air purification system.

According to an aspect, there is provided an air purification system including an air purification apparatus comprising an air inlet; an air outlet for expelling air in a target direction into a region and including an adjustment mechanism arranged to adjust said target direction in response to a target direction adjustment signal for aiming the air outlet at the face of a person in said region; at least one pollutant removal structure in between the air inlet and the air outlet; an air displacement apparatus for displacing air from the air inlet to the air outlet through the at least one pollutant removal structure and a sensor adapted to determine a breathing parameter of the person, wherein the air purification apparatus is configured to expel said air as a function of said breathing parameter.

For example, the air purification system may comprise a breathing sensor as the sensor and a controller responsive to the breathing sensor arranged to at least detect an inhalation phase of a breathing cycle of the person as the breathing parameter, wherein the controller is adapted to increase an air flow rate of the air expelled by the air outlet during the detected inhalation phase of the breathing cycle. This improves the efficiency of the clean air delivery, given that most of the clean air is delivered to the person at which the adjustable air output is aimed during an inhalation phase of the breathing pattern of that person. For example, the controller may be adapted to increase the air flow rate produced by the air displacement apparatus and/or adjust a diameter of the air outlet during the detected inhalation phase of the breathing cycle in order to increase the air flow rate of the air expelled by the air outlet, whilst the air purification system follows the position of the person at which the air outlet is aimed owing to the adjustment mechanism responsive to a target direction adjustment signal, which for instance may be generated by a separate device such as a laptop or the like running face recognition software or other suitable software that facilitates the recognition of a person's face and may track movement of the recognized face, based on which movement the target direction adjustment signal may be generated and relayed to the air purification system. To this end, the orientation of the air outlet or of the entire air purification apparatus may be adjustable by the adjustment mechanism.

Alternatively, the air purification system may further include a control system comprising a presence detection arrangement including an image capturing device arranged to capture an image of said region; and a processing arrangement arranged to process the image captured by the image capturing device in order to recognize a face in said image and to determine the position of said face in said region; and generate the target direction adjustment signal based on the determined position of said face in said region. In this manner, an autonomous air purification system capable of identifying a person for targeted delivery of purified air to the person is provided. In an embodiment, the control system is integrated in the air purification apparatus.

Preferably, the image capturing device is arranged to capture a sequence of images of said region; and the processing arrangement is arranged to update the target direction adjustment signal in accordance with a change in the position of said face in said region detected from said sequence such that changes in the position of the person in that region can be tracked and the target direction in which clean air is delivered can be adjusted accordingly.

The image capturing device may be mounted on or in close vicinity of the air outlet, which has the advantage that the line of view of the image capturing device is automatically aligned with the air outlet, such that no alignment of the line of view of the image capturing device with the direction in which the air outlet delivers clean air is required.

Alternatively, the air purification system may further comprise a user input device, wherein the processing arrangement is further arranged to systematically vary the target direction adjustment signal until receiving a user input from the user input device indicative of said air being expelled in the target direction; trigger the image capturing device to capture an image of the region in response to the received user input; process the image captured by the image capturing device in order to recognize a face in said image and to determine the position of said face in said region; and correlate the target direction with the determined position. In this manner, the line of view of the image capturing device may be aligned with the target direction in which the adjustable air output delivers the clean air in a straightforward manner, which is particularly useful in cases where the image capturing device is not mounted on the air outlet (e.g. when a camera of a laptop is used by the system).

The air purification system may further comprise a substance delivery device responsive to the controller, wherein the controller is adapted to trigger the release of a substance by the substance delivery device into the air expelled by the adjustable air outlet during a detected specific phase, e.g. an inhalation or exhalation phase of the breathing cycle. By delivering the substance in the air flow during such a specific phase of the person at which the air flow is aimed, and effective delivery of the substance, e.g. a medicament or like, to the person can be achieved without significant losses of the substance to ambient. For example, where the air outlet is in close vicinity to the mouth or nose of the person, the substance may be delivered at the beginning of the inhalation phase such that the substance will be effectively inhaled during this inhalation phase, whereas if the air outlet is further removed from the mouth or nose of the person, the substance may be delivered during the exhalation phase, e.g. towards the end of the exhalation phase, such that the substance may travel towards the person and be in close vicinity to the person during the start of the next inhalation phase.

In another example embodiment, the air purification system further comprises a suction device including a suction port arranged to capture air exhaled by the person, said suction port including a suction device and at least one sensor including the sensor adapted to determine the breathing parameter of the person in said suction port arranged to monitor an analyte of interest in the exhaled air; and a monitoring device arranged to monitor vital signs of the person from sensor data provided by the at least one sensor as the breathing parameter. It has been surprisingly found that vital signs, e.g. vital signs related to the breathing pattern of a person may be reliably obtained in this manner if the suction device is positioned sufficiently close to the person being monitored. To this end, the at least one sensor may be at least one of an $O_2$ sensor, a $CO_2$ sensor, a relative humidity sensor and a gas temperature sensor.

The controller may be arranged to trigger the generation of an air flow aimed at the person during the monitoring of the vital signs with the monitoring device. It has been found that such an air flow may facilitate the determination of such vital signs, e.g. improve the accuracy of their determination.

For the same reason, the suction device may further comprise a guide surface extending from the suction port, wherein the controller is arranged to trigger the generation of an air flow aimed at the guide surface during the monitoring of the vital signs with the monitoring device.

According to another aspect, there is provided a computer program product comprising a computer readable storage medium having computer readable program instructions embodied therewith for, when executed on a processing arrangement of a control system for the air purification system of the aforementioned embodiments, cause the processing arrangement to trigger an image capturing device of the control system to capture an image of a region into which the air outlet of the air purification apparatus is arranged to expel air in a target direction; process the image captured by the image capturing device in order to recognize a face of a person in said image and to determine the position of said face in said region; trigger a sensor to determine a breathing parameter of the person; generate the target direction adjustment signal based on the determined position of said face in said region; generate an air flow generation control signal based on the determined breathing parameter; and transmit the generated target direction adjustment signal and the generated air flow generation control signal to the air purification apparatus for controlling the target direction of the air outlet and the expelling of clean air through the air outlet respectively, e.g. by adjusting the orientation of the air outlet or of the entire air purification apparatus as explained above and/or generating an air flow directed at the person during the person's inhalation or exhalation. Such a computer program product facilitates the operation of the air purification system in accordance with one or more embodiments of the present invention.

The computer program product may further comprise computer readable program instructions embodied therewith for, when executed on said processing arrangement, cause the processing arrangement to trigger the image capturing device to capture a sequence of images of said region; and update the target direction adjustment signal in accordance with a change in the position of said face in said region detected from said sequence, thereby facilitating tracking of a person's position with the targeted air flow.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
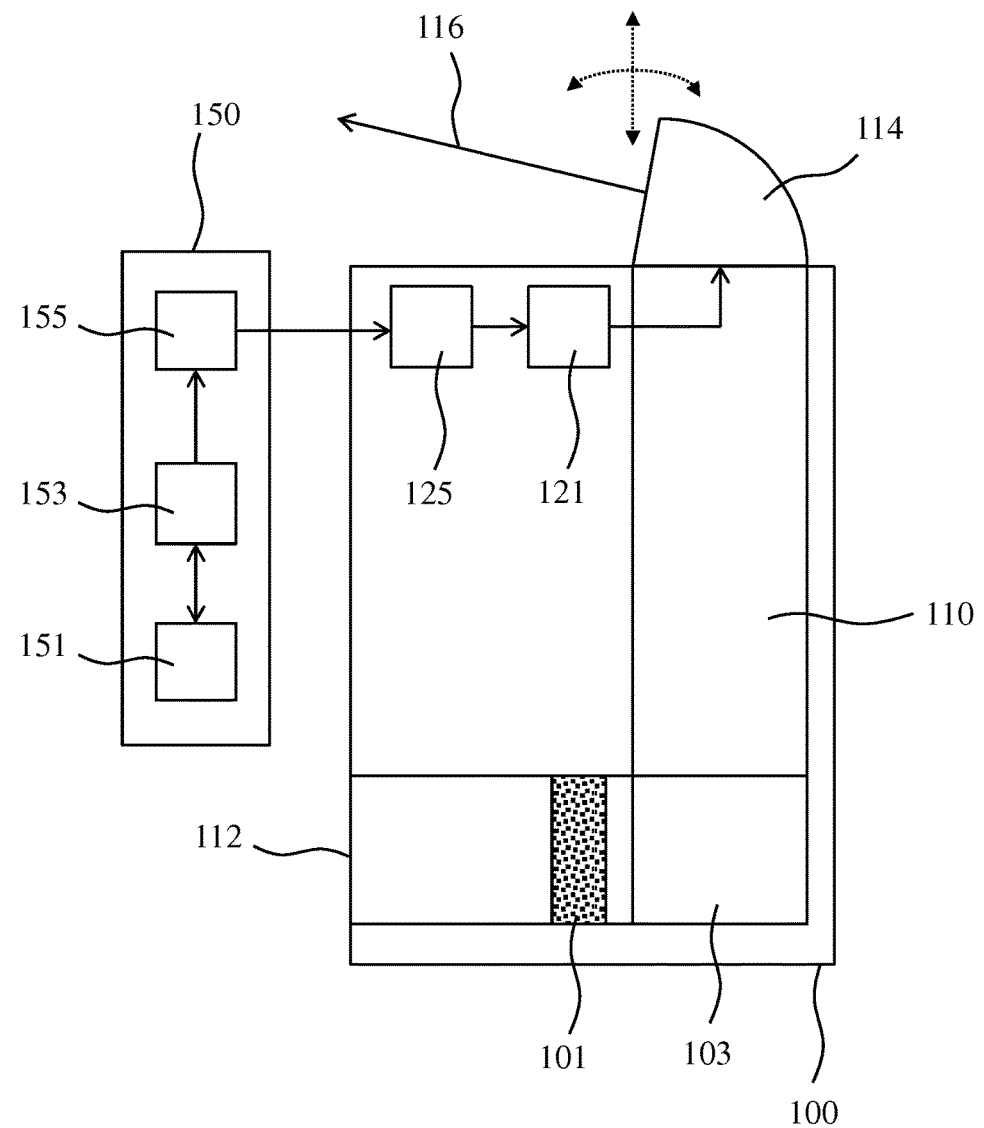
FIG. 1 schematically depicts an air purification system.

It should be understood that the Figures are merely schematic and are not drawn to scale. It should also be understood that the same reference numerals are used throughout the Figures to indicate the same or similar parts.

FIG. 1 schematically depicts an air purification system 10 including an air purification apparatus 100 that may be deployed in embodiments of the present invention. The air purification apparatus 100 comprises an air purification path 110 extending between an air inlet 112 and an air outlet 114. In the description below, reference will be made to an adjustable air outlet 114. It should be understood that this may mean that the orientation of the air outlet 114 may be adjusted relative to the air purification apparatus 100 or alternatively this may mean that the orientation of the entire air purification apparatus 100 may be altered in order to adjust the orientation of the air outlet 114, the latter embodiment being particularly suitable for orientation adjustments in a horizontal plane.

An air purification arrangement including one or more pollutant removal structures 101 is located in the air purification path 110 to remove targeted pollutants from the ambient air entering the air purification apparatus 100 through the air inlet 112 such that purified air is expelled from the air purification apparatus 100 through the adjustable air outlet 114. The one or more pollutant removal structures 101 may include one or more filters such as HEPA filters, carbon filters, catalytic converters, electrostatic precipitators, and so on, in order to remove pollutants such as particulate matter, pollen, odours, bacteria, formaldehyde and so on from the atmosphere in a space in which such an air purification apparatus 100 is placed.

The air purification path 110 further comprises an air displacement apparatus 103, such as a pump, fan, ionic wind generator or the like for sucking ambient air into the air purification path 110 through the air inlet 112 and expelling the purified air back into ambient through the adjustable air outlet 114. The air purification apparatus 100 may be any suitable type of air purification apparatus, e.g. may be a portable air purifier such as a clean air delivery device. The one or more pollutant removal structures 101 and the air displacement apparatus 103 may be located in any suitable location within the air purification path 110 in between the air inlet 112 and the air outlet 114. In an embodiment, the air displacement apparatus 103 is located in between the one or more pollutant removal structures 101 and the air outlet 114 although alternative embodiments, e.g. wherein the air displacement apparatus 103 is located in between the one or more pollutant removal structures 101 and the air inlet 112 may also be contemplated.

The orientation of the adjustable air outlet 114 may be adjusted by an adjustment mechanism 121 such as a motor, actuator, or the like, adapted to change the orientation of the adjustable air outlet 114, thereby changing the target direction 116 in which the adjustable air outlet 114 expels purified air from the air purification apparatus 100. The adjustable air outlet 114 may be shaped such that a focused stream of purified air, i.e. stream of air having minimal divergence, is expelled from the air purification apparatus 100 in a direction 116. For example, the adjustable air outlet 114 may be nozzle-shaped. The adjustment mechanism 121 may be adapted to change at least one of the horizontal and the vertical orientation of the adjustable air outlet 114.

Alternatively, the adjustment mechanism 121 may be adapted to adjust the orientation of the air purification apparatus 100 as a whole as previously explained. For example, the air purification apparatus 100 may have wheels or casters driven by the adjustment mechanism 121 such that the orientation of the air purification apparatus 100 may be adjusted to aim the air outlet 114 in the desired target direction. For the avoidance of doubt, where reference is made to an adjustable air outlet 114, it should be understood that this also is intended to cover embodiments in which the air outlet 114 may be adjusted by adjusting the orientation of the entire air purification apparatus 100.

Figure 2:
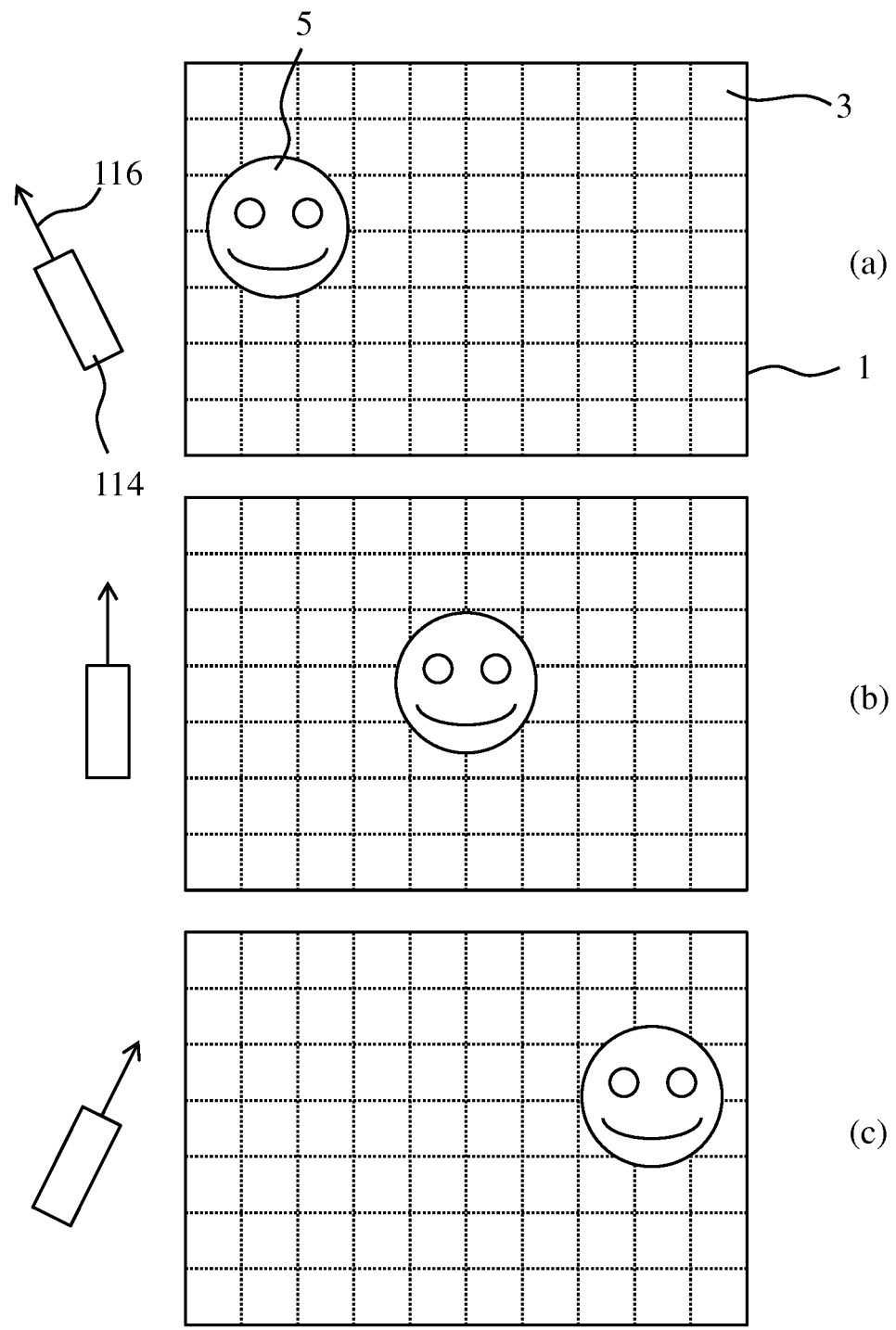
FIG. 2 schematically depicts an operating principle of an air purification system.

The adjustment mechanism 121 is responsive to a target direction adjustment signal generated by a control system 150, which may form part of the air purification system 10 or may be a separate system adapted to communicate the target direction adjustment signal to the adjustment mechanism 121. Such a control system 150 typically comprises a presence detection arrangement including an image capturing device 151, e.g. a camera or the like, coupled to a processing arrangement 153 arranged to process an image captured by the image capturing device 151 in order to recognize a face in a region of the captured image, i.e. to determine the position of the face in this region and to generate the target direction adjustment signal based on the determined position of the face in this region, such that the stream of purified air ejected from the adjustable air outlet 114 may be aimed at the face of the person in this image. This is explained in further detail with the aid of FIG. 2, in which a series of images 1 captured with the image capturing device 151 are schematically depicted. Each image 1 displays a region 3 in which a face 5 may occur, with the region 3 typically corresponding with a region into which the adjustable air outlet 114 may direct the purified air stream in the targeted direction 116, i.e. towards a particular part of the region 3. In (a), the face 5 is located in a left part of the region 3, in (b) the face 5 is located in a central part of the region 3 and in (c) the face 5 is located in a right part of the region 3. In an embodiment, the image capturing device 151 is adapted to capture a sequence of images 1, e.g. to track movement of the face 5 through the region 3, e.g. from left to right when going from (a) to (c).

The processing arrangement 153, which may comprise one or more processors, such as for example a ASIC, a CPU, a CPU supported by a GPU, a microprocessor or a combination thereof, is typically adapted to process the images 1 in order to identify the location of the face 5 within the region 3 captured in the image 1. For example, the processing arrangement 153 may deploy face recognition algorithms or other suitable algorithms for this purpose. Such algorithms are well-known per se and are therefore not discussed in further detail for the sake of brevity only.

The processing arrangement 153 is further adapted to associate the identified location of the face 5 within the region 3 captured in the image 1 with an orientation of the adjustable air outlet 114. In particular, the processing arrangement 153 is adapted to determine if the target direction 116 in which the adjustable air outlet 114 is aimed corresponds to the location of the face 5 within the region 3 captured in the image 1. If this is not the case, the processing arrangement 153 is adapted to determine a difference between the location within the region 3 corresponding to the actual target direction 116 and the location of the face 5 within this region and to generate a target direction adjustment signal for the adjustment mechanism 121 based on this determined difference, which target direction adjustment signal causes the adjustment mechanism 121 to adjust the aim of the adjustable air outlet 114 such that this outlet is aimed, i.e. has a target direction 116, at the location of the face 5 in the region 3 such that the purified air stream generated by the adjustable air outlet 114 is aimed at the face 5. In this manner, the purified air stream may be automatically aimed at the face 5 of a person in the region 3 whilst changes in the position of the face 5 of the person in the region 3 may be tracked with the image capturing device 151 by capturing a sequence of images as previously explained, with the processing arrangement 153 adapted to update the target direction adjustment signal in accordance with detected changed in the position of the face 5 of the person in the region 3 as will be readily understood by the skilled person.

Figure 3:
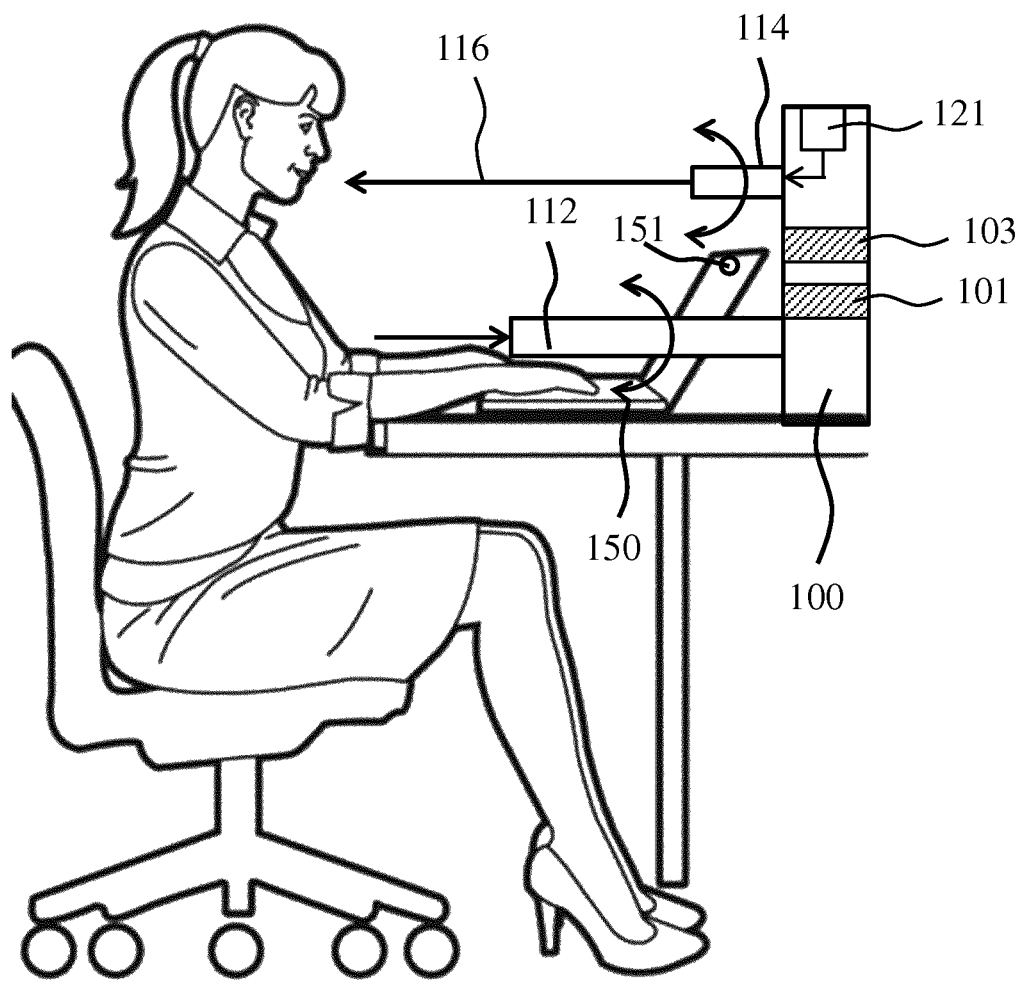
FIG. 3 schematically depicts another air purification system.

In case of a separate control system 150, e.g. a control system installed by a computer program product on a computing device such as a laptop computer, tablet computer, personal computer, smart phone or the like, with the computing device further comprising the image capturing device 151, e.g. an integral camera or a peripheral camera such as a web cam or the like, the control system 150 may further comprise a communication module 155 communicatively coupled to the processor arrangement 153 and arranged to communicate the target direction adjustment signal to a communication module 125 of the air purification system 10, with the communication module 125 communicatively coupled to the adjustment mechanism 121 for relaying the target direction adjustment signal generated by the processor arrangement 153 to the adjustment mechanism 121. The communication modules 155 and 125 may be adapted to communicate with each other using any suitable wired communication protocol, e.g. TCP/IP, FireWire (IEEE 1394), USB, a proprietary protocol and so on, or a wireless communication protocol, e.g. Wi-Fi, Bluetooth, a proprietary wireless commutation protocol, or the like. An example embodiment of such a separate control system 150 is schematically depicted in FIG. 3, in which the air purification system 10 comprises a desktop mountable air purification apparatus 100 in which the adjustment mechanism 121 is communicatively coupled to a laptop computer implementing the control system 150 and comprising the image capturing device 151 aimed at the region 3 in which the face 5 of the person behind the desk and using the laptop computer is located. As will be explained in more detail below, in some embodiments the aiming direction of the air inlet 112 may also be adjustable, e.g. to effectively collect air exhaled by the person behind the desk.

Figure 4:
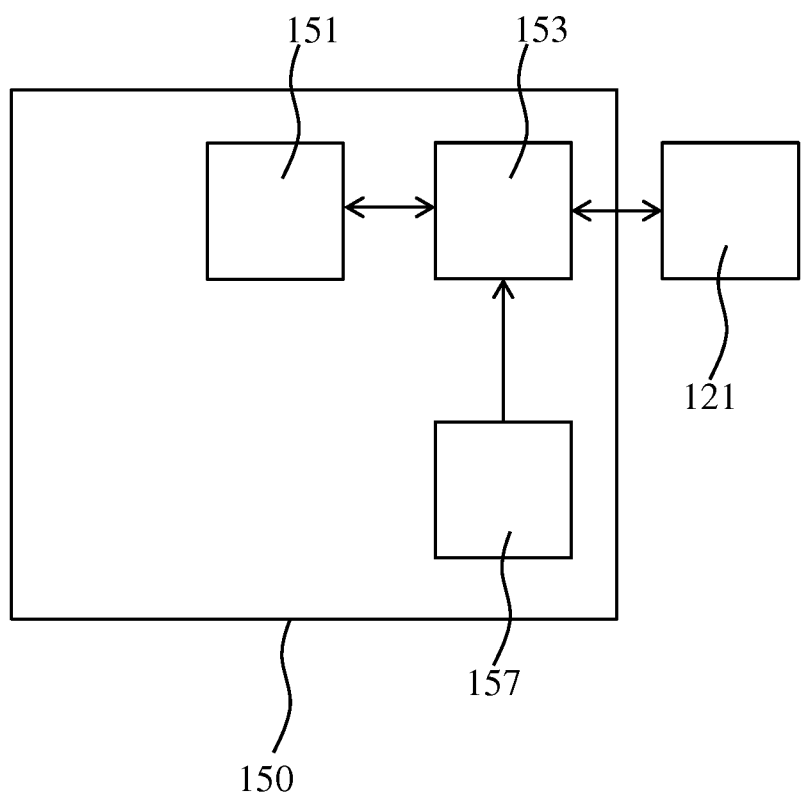
FIG. 4 schematically depicts a control system for an air purification system.

In order to relate the actual aim of the adjustable air outlet 114 to a particular part of the region 3, the control system 150 may be adapted to implement a calibration procedure. For example, the processing arrangement 153 may be adapted to systematically vary the target direction adjustment signal until receiving a user input indicative of the air stream being expelled by the adjustable air outlet 114 in the target direction 116 from a user input device, e.g. a user interface of a computing device implementing the control system 150, upon which the processing arrangement 153 may trigger the image capturing device 151 to capture an image 1 of the region 3 in response to the received user input and to process the captured image in order to recognize a face 5 in the image and to determine the position of the face 5 in the region 3 as previously explained. In this manner, the processing arrangement 153 may correlate the target direction 116 with the determined position of the face 5 in the region 3. For example, as schematically depicted in FIG. 4, the control system 150 may further comprise a user interface 157, e.g. one or more of a touchscreen, keyboard, mouse, button(s), dial(s), and so on, with the processor 153 being responsive to the user interface 157.

Further refinements and variations to such a calibration procedure may of course be contemplated. For example, the air purification apparatus 100 may be positioned adjacent to the laptop computer implementing the control system 150, in which case the users head, i.e. face 5, may be positioned in such a way that it is in a central position in the region 3 and the adjustable air outlet 114 may be aimed at the face 5. The same procedure may be followed to set boundary conditions of the range in which the adjustable air outlet 114 may be moved, such as the leftmost and rightmost positions of the adjustable air outlet 114, with the user confirming for each of these positions that the air streams are delivered in the intended target direction 116, at the face 5. Once the air purification system 10 has been calibrated, the position of the image capturing device 151 relative to the air purification apparatus 100 should remain unchanged.

In a further refinement, the calibration procedure may further include determining a distance between the adjustable air outlet 114 and the user as a function of the orientation of the air outlet 114. For example, where the image capturing device 151 captures an image of the face 5 in a central part of the region 3, angular orientation information of the adjustable air outlet 114 may be used to approximate this distance. For instance, where this angular orientation information indicates that the adjustable air outlet 114 is aiming straight ahead, the distance between the adjustable air outlet 114 and a face 5 will be smaller than in a scenario where this angular orientation information indicates that he adjustable air outlet 114 is aiming at the face 5 under a certain angle, e.g. 45°. This distance information may be used to assign different operational parameters, e.g. air flow rates, velocities, spreading angles of the adjustable air outlet 114, and so on, to different user positions relative to the adjustable air outlet 114. In this manner, the same amount of clean air and/or the same clean air profiles may be delivered to the person at which the adjustable air outlet 114 is aimed regardless of actual air outlet-to-user distances.

Figure 5:
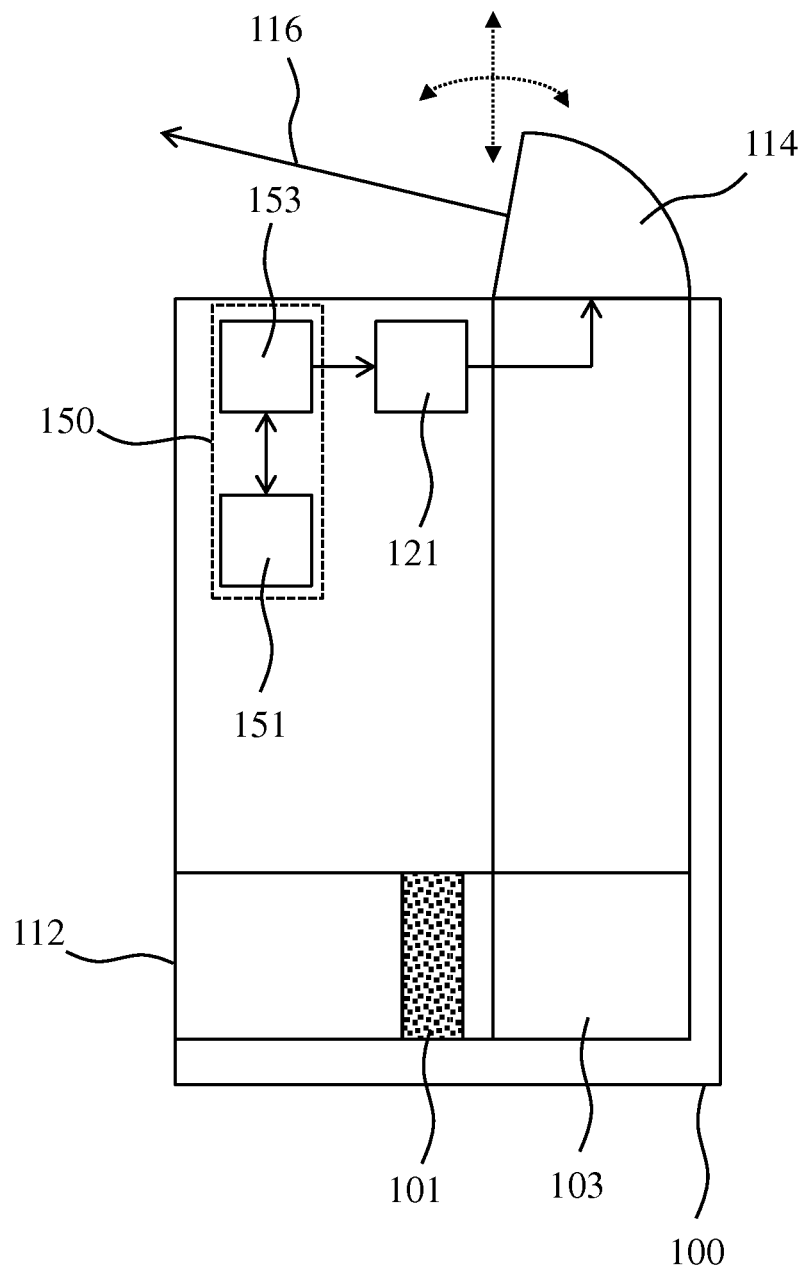
FIG. 5 schematically depicts yet another air purification system.

In yet another embodiment, the distance of the adjustable air outlet 114 to the face 5 of the user may be extracted by the control system 150 from the ratio between the area of the face 5 and the area of the region 3. In this embodiment, the control system 150 or at least the image capturing device 151 preferably forms an integral part of the air purification system 10, e.g. the air purification apparatus 100 as schematically depicted in FIG. 5. Same approach of determining air outlet-to-face distance based on before mentioned ration can be also used in cases where the image capturing device 151 doesn't form an integral part of the control system 150, e.g. if a built-in camera of a laptop is used. In such cases, the adjustable air outlet 114 is preferably placed directly above and in close proximity of the image capturing device 151.

Figure 6:
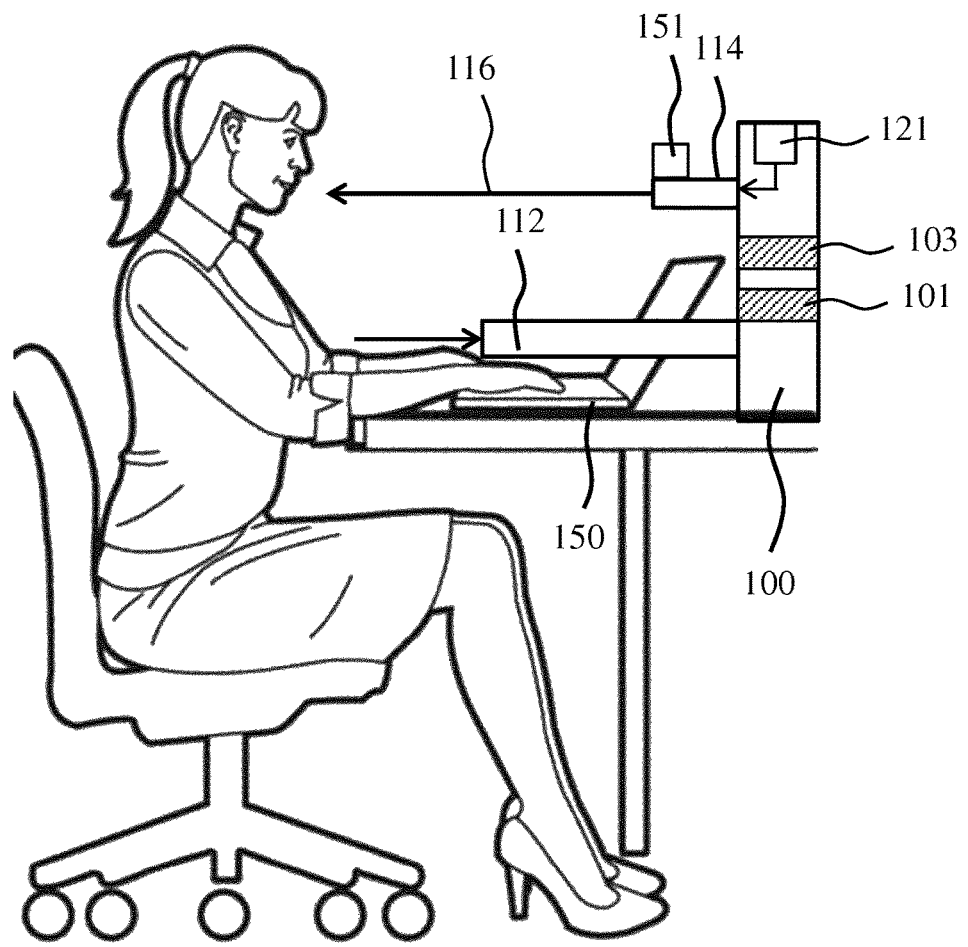
FIG. 6 schematically depicts yet another air purification system.

In an alternative embodiment, which is schematically depicted in FIG. 6, only part of the control system 150, e.g. the image capturing device 151, may form part of the air purification system 10. As will be immediately apparent, in this embodiment the respective wireless communication modules 155 and 125 may be omitted, in particular when the processor 153 also forms an integral part of the air purification system 10. In a particularly advantageous embodiment, the image capturing device 151 is mounted on the adjustable air outlet 114 such that a fixed relation exists between the optical axis of the image capturing device 151 and the target direction 116 of the adjustable air outlet 114. For example the optical axis may coincide with the target direction 116. An example embodiment of such an arrangement is schematically depicted in FIG. 6, in which the image capturing device 151 is mounted on the adjustable air outlet 114 of a desktop air purification apparatus 100.

In such an embodiment, calibration of the air purification system 10 is not required due to the known fixed relation between the optical axis of the image capturing device 151 and the target direction 116 of the adjustable air outlet 114. For example, where the optical axis coincides with the target direction 116, the processor 153 may control the adjustment mechanism 121 by causing the adjustment mechanism 121 to adjust the orientation of the adjustable air outlet 114 until receiving an image 1 from the image capturing device 151 in which the face 5 of the user is central to that image.

Moreover, because the area of the region 3 as captured by the image capturing device 151 is fixed, determination of the area of the face 5 may be used to estimate a distance between the user and the adjustable air outlet 114, which distance information may be used to tune the operation of the air purification apparatus 100 as previously explained.

In yet another embodiment, a predefined database may be provided in which each location of the face 5 within the region 3 is related to a particular orientation of the adjustable air outlet 114 such that calibration of the air purification system 10 may not be required. As will be apparent to the skilled person, this requires positioning the air purification apparatus 100 and the image capturing device 151 in a well-defined manner such that the orientation of the adjustable air outlet 114 relative to the image capturing device 151 is well-defined.

In some embodiments, the image capturing device 151 may be replaced by a position tracking sensor arrangement to determine the position of the user relative to the air purification apparatus 100 to facilitate delivery of the clean air to the face 5 of the user. Non-limiting examples of such position tracking sensors include infrared cameras, light barriers and other suitable sensors exploiting some form of electromagnetic field. In addition, the air purification system 10 may further comprise additional sensors to automatically detect the alignment of system components, e.g. the adjustable air outlet 114 and the image capturing device 151 for calibration purposes.

Figure 7:
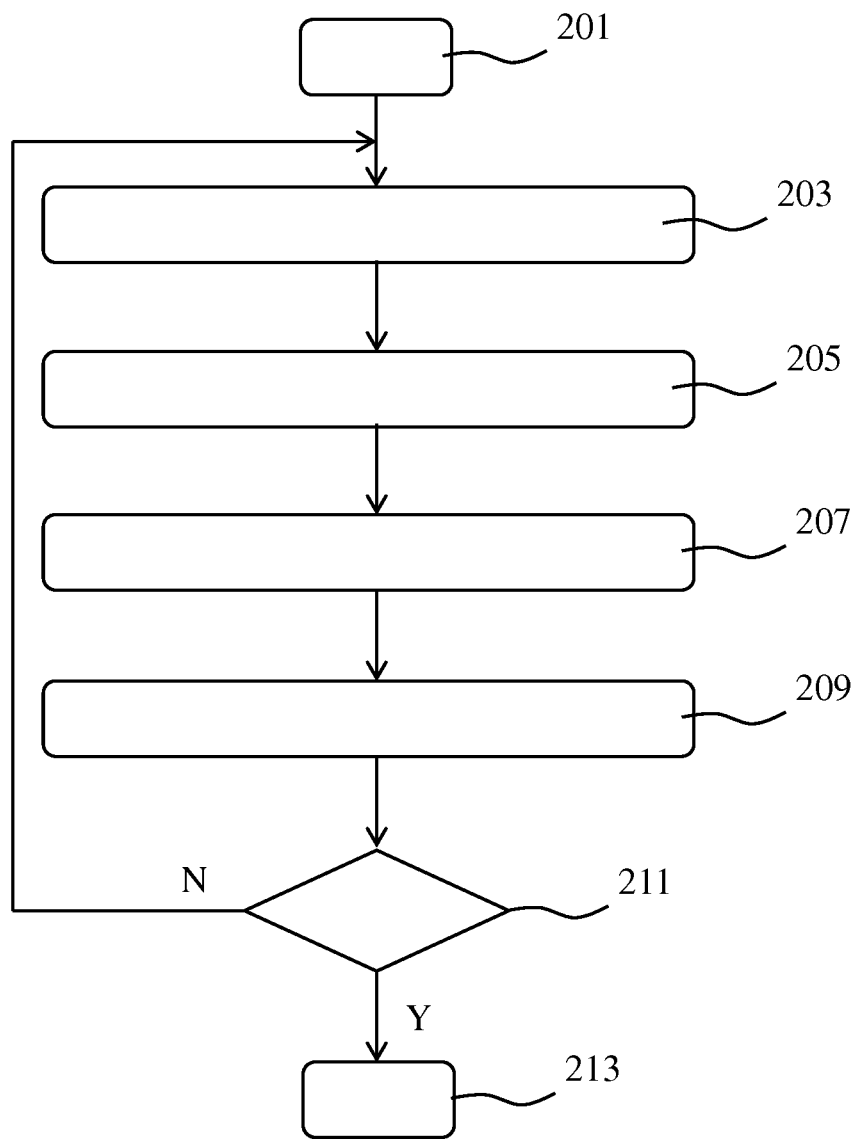
FIG. 7 is a flowchart of a method of controlling an air purification system according to an embodiment.

FIG. 7 is a flowchart of an air delivery method 200 that may be implemented by the air purification system 10. The method 200 starts in 201, for example by switching on the air purification apparatus 100 and the control system 150, after which the method 200 proceeds to 203 in which an image 1 is captured with the image capturing device 151 of the region 3 in which the user is located. The location (position) of the face 5 of the user within the region 3 captured in the image 1 is identified in 205 and if necessary a target direction adjustment signal is generated in 207 by the processor 153 for the adjustment mechanism 121 based on a discrepancy between the actual direction 116 in which the adjustable air outlet 114 is aimed and the determined location of the face 5 in the region 3. At the same time, a sensor reading of a breathing parameter of the patient may be obtained, e.g. the detection of an inhalation or exhalation phase in the breathing cycle of the person, or a composition of the breath of the person, e.g. the determination of (a concentration of) an analyte of interest of the person's breath, which determined breathing parameter may be used to generate an air flow generation control signal and transmit the air flow generation control signal to the air purification apparatus 100. In 209, the adjustment mechanism 121 adjusts the aim of the adjustable air outlet 114 in accordance with the received target direction adjustment signal such that the stream of purified (clean) air generated by the adjustable air outlet 114 is aimed at the face 5. At the same time, the air flow to be delivered through the adjustable air outlet 114 may be generated in accordance with the air flow generation control signal, as will be explained in more detail below. It is checked in 211 if this procedure should be repeated; if so, the method 200 reverts back to 203, otherwise the method 200 terminates in 213.

Figure 8:
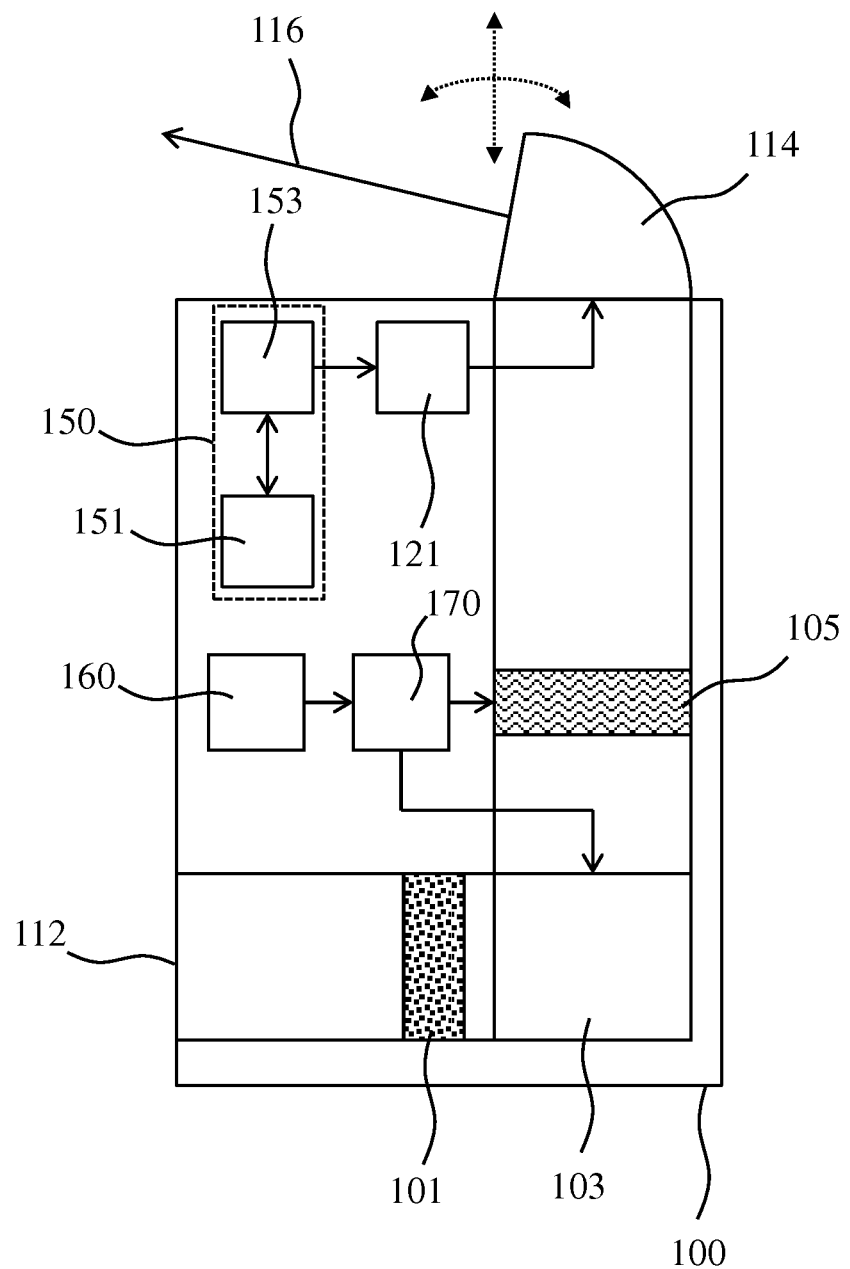
FIG. 8 schematically depicts an air purification system according to an example embodiment.
Figure 9:
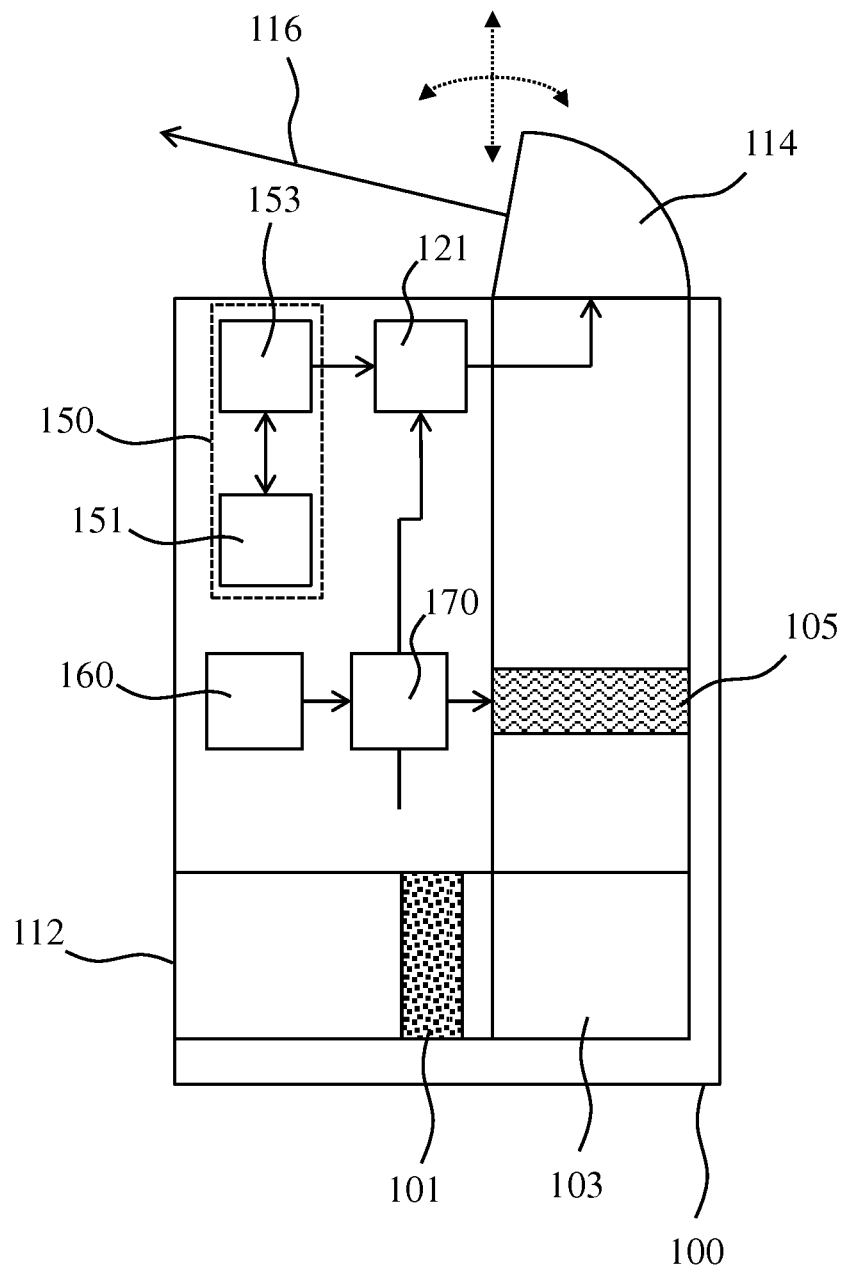
FIG. 9 schematically depicts an air purification system according to yet a further embodiment.

FIG. 8 schematically depicts an air purification system 10 according to an example embodiment. In this embodiment, the air purification system 10 further comprises a breathing sensor 160 arranged to detect a breathing parameter of the person, e.g. at least detect an inhalation phase of a breathing cycle of the person at which the adjustable air outlet 114 is aimed and a controller 170 responsive to the breathing sensor 160 arranged to control the air displacement apparatus 103, wherein the controller 170 is adapted to increase the air flow rate of the air expelled by the adjustable air outlet 114 during a detected inhalation phase of the breathing cycle and/or reduce the air flow rate of the air expelled by the adjustable air outlet 114 during the detected exhalation phase of the breathing cycle. Alternatively, as schematically depicted in FIG. 9, the controller 170 may control the adjustment mechanism 121 to adjust a configuration of the adjustable air outlet 114, e.g. a nozzle diameter or the like, to increase the air flow rate of the air expelled by the adjustable air outlet 114 during the detected inhalation phase of the breathing cycle and/or reduce an air flow rate of the air expelled by the adjustable air outlet 114 during the detected exhalation phase of the breathing cycle. In an embodiment, air is only delivered to the face 5 of the user during the inhalation cycle of the user. In this manner, the clean air or an increased rate of thereof may be delivered to the user (only) during his or her inhalation cycle, which may improve the efficiency of the air purification system 10, increase the lifetime of the one or more pollutant removal structures 101 and/or may improve user satisfaction. It should be understood that such a breathing sensor 160 may be included in any of the herein described embodiments of the air purification system, including the embodiments described in FIG. 1-6.

In an embodiment, the breathing sensor 160 may be a temperature sensor arranged to detect a temperature of a region of the face 5 around the nose of the user. As is well-known per se, the temperature around the nose is higher during exhalation than during inhalation such that the inhalation phase and the exhalation phase of the breathing cycle may be readily identified from the temperature data provided by the temperature sensor. In an alternative embodiment, the breathing sensor 160 may be an image capturing device such as a camera to detect the breathing cycle of the user. For example, the image capturing device may feed a stream of images to the controller 170, with the controller 170 adapted to process these images in order to detect e.g. chest motion or nostril size changes of the user in these images and derive the breathing cycle from this chest motion or nostril size changes. Algorithms for determining a breathing cycle from such physiology changes are well-known per se and are therefore not described in further detail for the sake of brevity only. It is furthermore noted that although the breathing sensor 160 and the controller 170 are shown as separate components, it should be understood that the breathing sensor 160 in some embodiments may be implemented by the image capturing device 151 and that the controller 170 in some embodiments may be implemented by the processor 153 of the control system 150. As before, the control system 150 may form an integral part of the air purification system 10 or may be separate to this system, e.g. may be implemented by a computer program product loaded onto a computing device as explained above.

In an embodiment, the air purification system 10 further comprises a substance delivery device 105 responsive to the controller 170, wherein the controller 170 is adapted to trigger the release of a substance by the substance delivery device into the air expelled by the adjustable air outlet 114 during a detected specific phase of the breathing cycle. This may be the inhalation phase if the substance is delivered by an air outlet 114 in close proximity to the person or may be the exhalation phase if the substance is delivered by an air outlet 114 further away from the person, such that the substance can travel towards the person during the exhalation phase such that the substance may be inhaled during the next inhalation phase of the person. The substance delivery device 105 for example may comprise a canister filled with the substance and a release valve under control of the controller 170. In this manner, a substance such as an aerosol or powdered medicament or oxygen, e.g. to improve sleep, may be released into the air stream directed at the face 5 of the user by the adjustable air outlet 114 only during the specific phase of the breathing cycle of the user, which increases the efficiency of the substance delivery to the user by reducing losses of the substance to ambient surroundings caused by the user not inhaling the substance. The substance delivery device 105 may be located in any suitable location within the air purification apparatus 100, e.g. downstream from the air displacement apparatus 103 in the air purification path 110, e.g. in the vicinity or in the adjustable air outlet 114.

Figure 10:
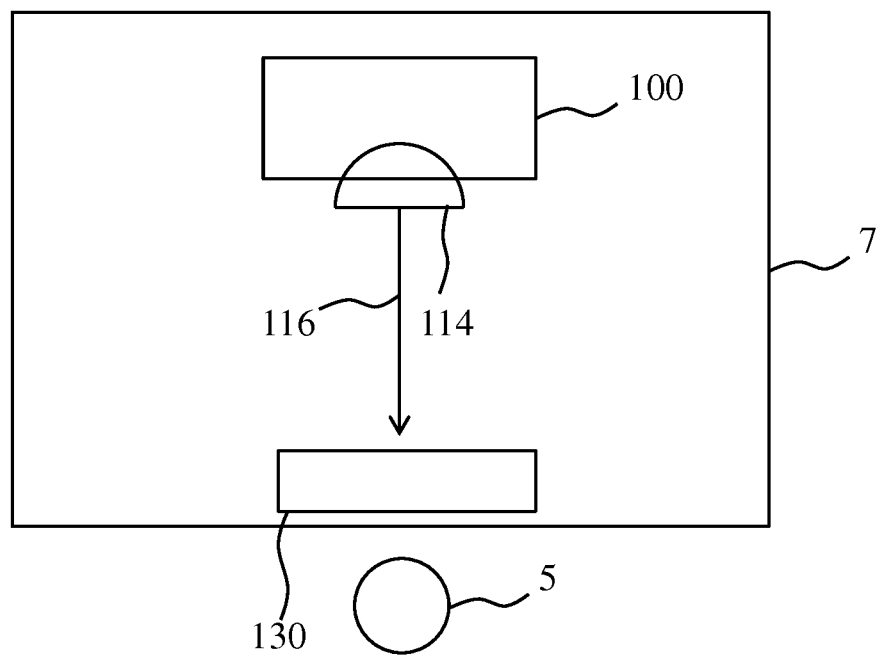
FIG. 10 schematically depicts an aspect of an air purification system according to an embodiment.
Figure 11:
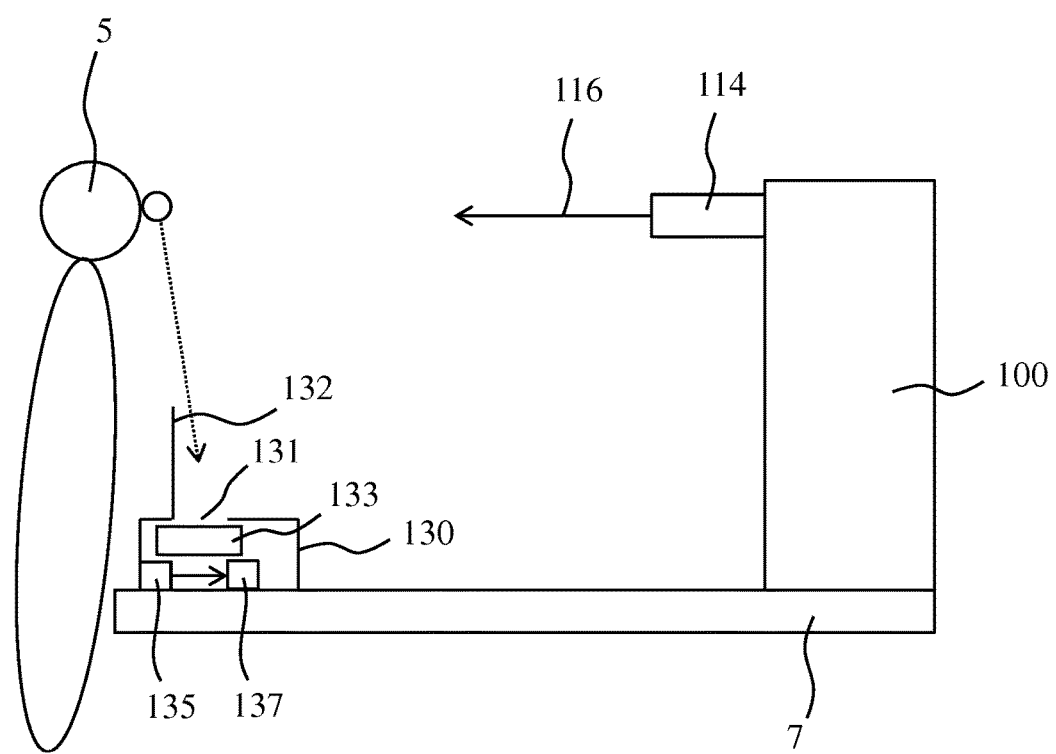
FIG. 11 schematically depicts an air purification system according to yet a further embodiment.

FIG. 10 schematically depicts a top view and FIG. 11 schematically depicts a side view of an air purification system 10 according to yet another example embodiment. In this embodiment, the air purification apparatus 100 may be a desktop air purification apparatus for mounting on the desktop surface 7, with the air purification system 10 further comprising a suction device 130 including a suction port 131 including a suction device 133 such as a ventilator or a vacuum pump arranged to capture air exhaled by the person. To this end, the suction device 130 should be positioned such that the suction port 131 receives a substantial portion of the air exhaled by the user, e.g. under the nose of the user. The suction device 130 may be a separate component of the air purification system 10 or may form part of the air purification apparatus 100. At least one sensor 135 may be arranged in the suction port 131 to monitor an analyte of interest in the exhaled air by the user. For example, the at least one sensor 135 may be at least one of an $O_2$ sensor, a $CO_2$ sensor, a relative humidity sensor and a gas temperature sensor.

A vital signs monitoring device 137 may be provided to monitor vital signs, e.g. breathing characteristics (i.e. a breathing parameter) such as breathing pattern and/or breath composition of the person from sensor data provided by the at least one sensor 135. The vital signs monitoring device 137 may be located in the suction device 130 or alternatively the vital signs monitoring device 137 may be implemented by the processor 153 of the control system 150.

The controller 170 may be responsive to the suction device 130, i.e. to the vital signs monitoring device 137. In an embodiment, the controller 170 may be arranged to deliver clean air or increase delivery of clean air to the user during an inhalation phase of the breathing cycle of the user as previously explained in response to the detection of the inhalation phase with the suction device 130. In another embodiment, the controller 170 may be arranged to define the composition of the clean air to be delivered to the user through the adjustable air outlet 114 in response to exhaled air composition information concerning the air exhaled by the user as obtained with the one or more sensors 135. For example, in case of the detection of components in the exhaled air indicative of halitosis or another condition that may cause the breath of the user to be perceived as smelling unpleasantly, the controller 170 may control the release of one or more scented substances, e.g. by controlling one or more substance delivery devices 105, to mask such unpleasant smells.

In an embodiment, the controller 170 is further adapted to trigger the generation of an air flow with the adjustable air outlet 114 aimed at the person, e.g. at a part of the body of the person below his or her face 5, during the monitoring of the vital signs with the monitoring device 135. Such an air flow may promote the guidance of breath exhaled by the user into the suction device 130. Alternatively or additionally, the suction device 130 may further comprise a guide surface 132 extending from the suction port 130, e.g. in an upwardly extending direction, wherein the controller 170 is arranged to trigger the generation of an air flow aimed at the guide surface during the monitoring of the vital signs with the monitoring device 135 to promote the guidance of breath exhaled by the user into the suction device 130.

A number of experiments have been performed to establish proof of concept of the ability of the suction device 130 to monitor vital signs based on exhaled breath received by the suction device 130. In these embodiments, the suction device 130 included a relative humidity sensor, a gas temperature sensor and an $O_2$ sensor. The suction port 131 had an inner diameter of 15 mm. Some experiments were performed using the breathing of a test person to be sensed; other experiments use an artificial breathing device (a pulsed gas stream of nitrogen) to deliver the gas to be sensed. In most cases a fresh air delivery device having a nozzle outlet with an inner diameter of 51 mm was positioned at different distances above the suction port 131 and operated to deliver an air flow to the suction device 130. In the given examples this air flow is pulsed (20 s on, 20 s off) to more clearly indicate the advantage of having this supporting air flow present.

Figure 12:
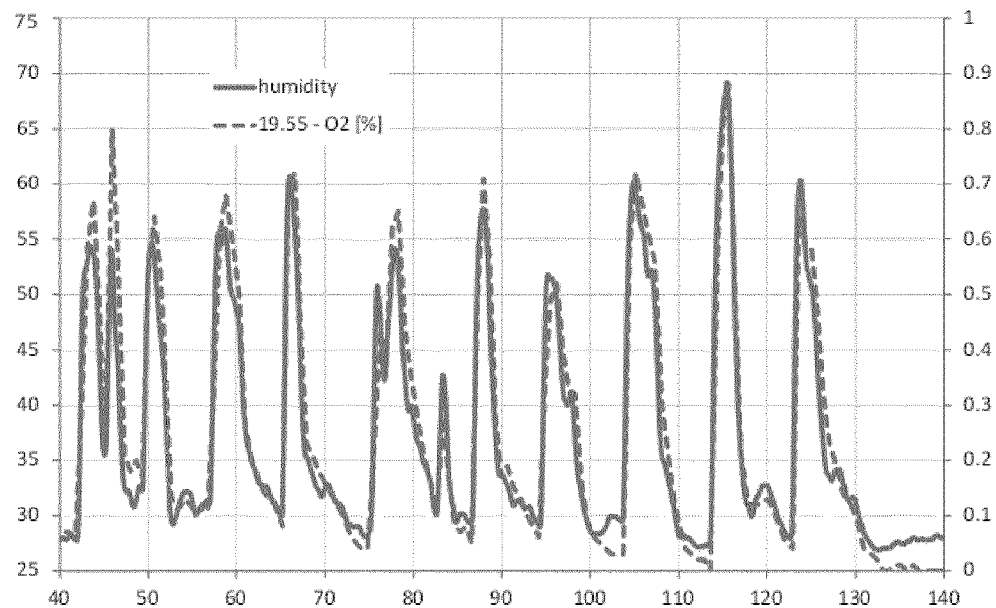
FIGS. 12-17 depict respective graphs demonstrating a proof of concept of an air purification system according to an embodiment.
Figure 13:
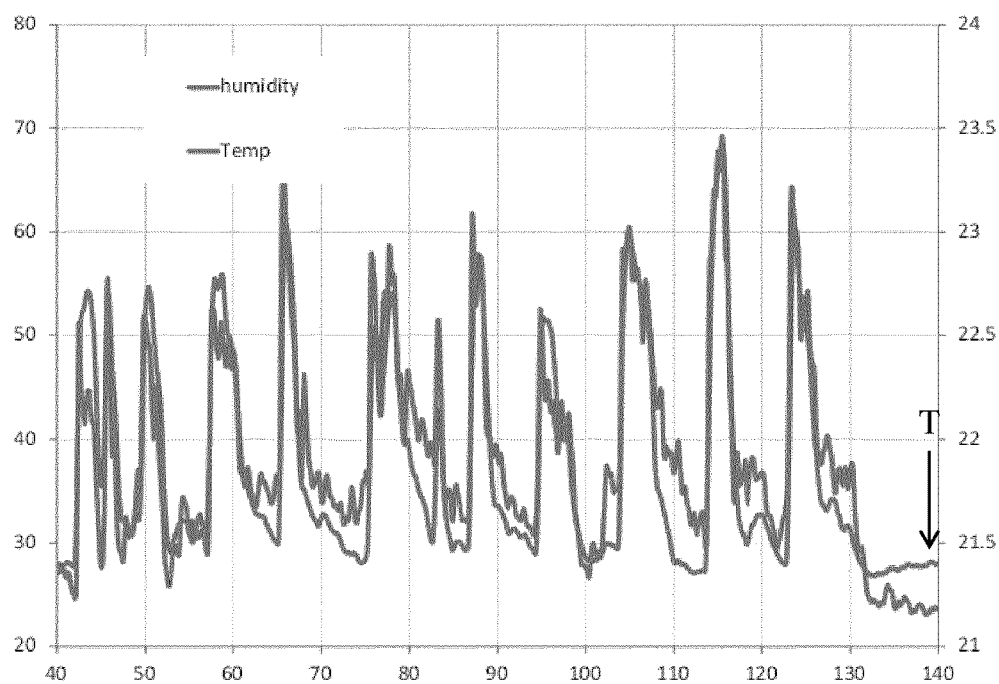

FIG. 12 and FIG. 13 depict respective graphs representing sensor data obtained with the suction device 130 with a suction flow of 16 L/min from a distance of 10 cm to the nose of the test person. The x-axis of each graph depicts time (s). In FIGS. 12 and 13, the left y-axis depicts measured relative humidity (in %) and the right y-axis depicts the change in oxygen content ($O_2(t)-O_2(t=0)$, in %) and temperature (° C.) respectively. As can be clearly seen from these graphs, the sensor readings closely mimic the breathing pattern of the test person, thereby clearly demonstrating that vital signs, e.g. breathing information, may be obtained with the suction device 130.

Figure 14:
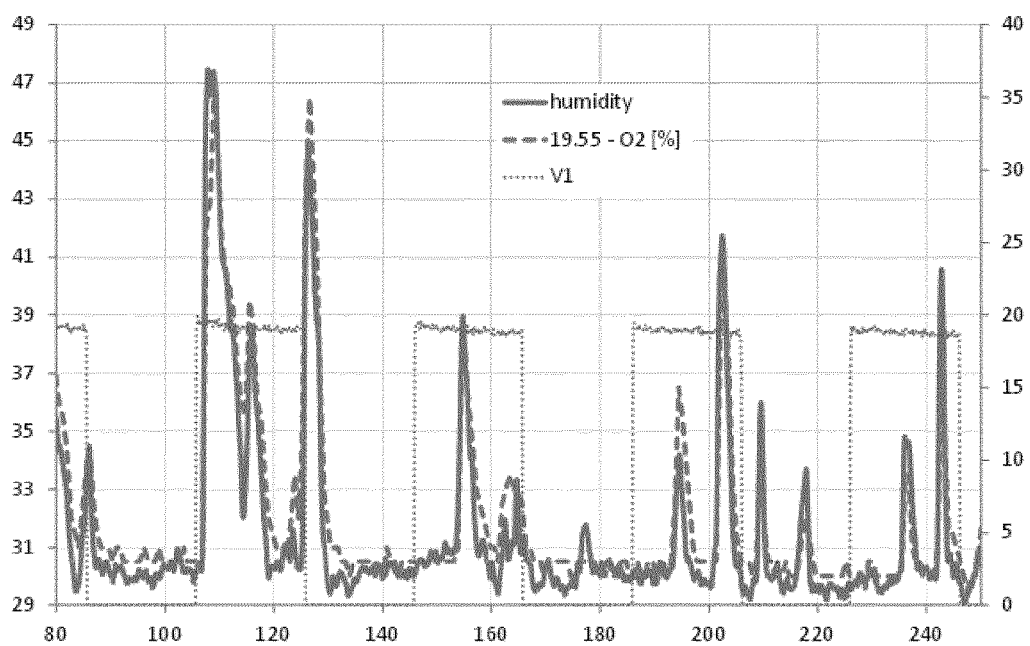

In a further experiment, the distance between the nose of the test person and the suction port 131 was increased to 40 cm with an air purification apparatus 100 being arranged to deliver a pulsed air stream towards the body of the test person (slightly below the nose) from a distance of 40 cm under a downward angle of 45°. This air stream was pulsed (20 s on, 20 s off) to clearly demonstrate the improved performance with air stream present. The results are shown in FIG. 14, which depicts the obtained sensor data with the relative humidity sensor (%, left y-axis) and 02 sensor (change of $O_2$ in %, right y-axis) as a function of time (s, x-axis). The delivery of the pulsed air stream is shown in FIG. 14 as V1. From this graph, it can be clearly recognized that such a supporting air flow delivered by the air purification apparatus 100 facilitates the reliable detection of vital signs, e.g. breathing patterns, with the suction device 130.

Figure 15:
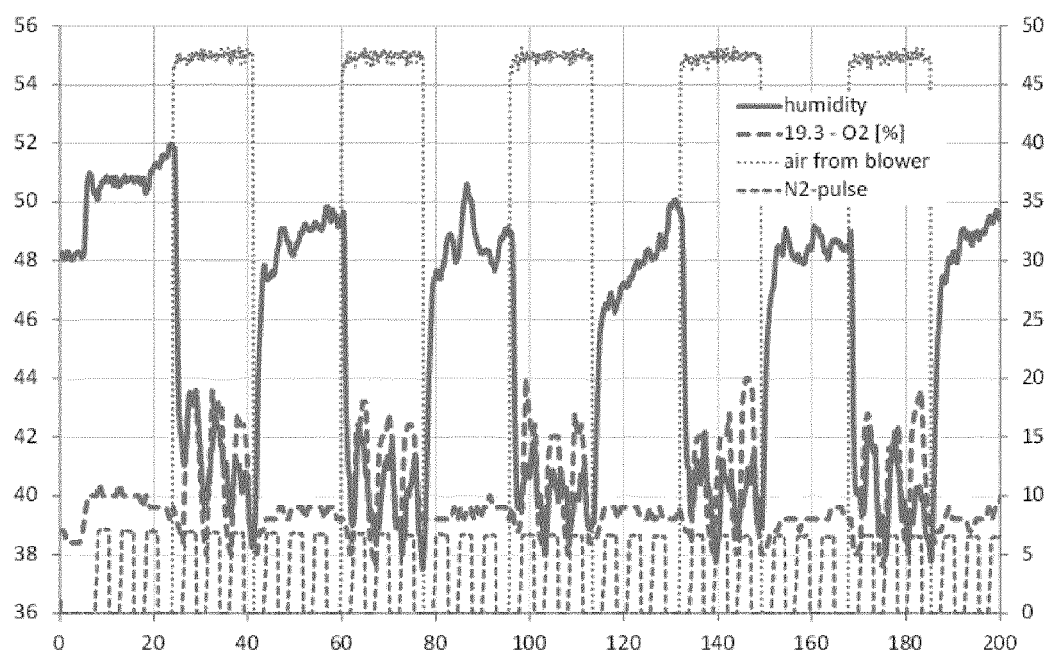

In a further experiment, nitrogen gas was used in place of the exhaled air of a test person to make "breathing pattern" more defined. This pulsed nitrogen flow (3 s on, 2 s off) mimicking exhalation was directed 32 cm above and in parallel with the suction port 131 with the fresh air delivery device being arranged 52 cm above the suction port 131 and arranged to deliver a pulsed air stream (47 L/min, 20 s on, 20 s off) into the suction port 131 at a distance of 10 cm from the nitrogen outlet. Suction into the suction device 130 was 16 L/min. The results are shown in FIG. 15, from which it is clear that during delivery of the pulsed air stream to the suction device 130, the pulsed nature of the nitrogen flow is accurately monitored, thereby demonstrating that a supporting air flow may be used to guide exhaled breath into the suction device 130. Moreover, FIG. 15 clearly demonstrates that the baseline of the sensed signals may be determined based on the composition of the supporting air flow, which may be advantageously used to define a stable background level for the sensor signals, thereby improving the signal-to-noise ratio of these signals.

Figure 16:
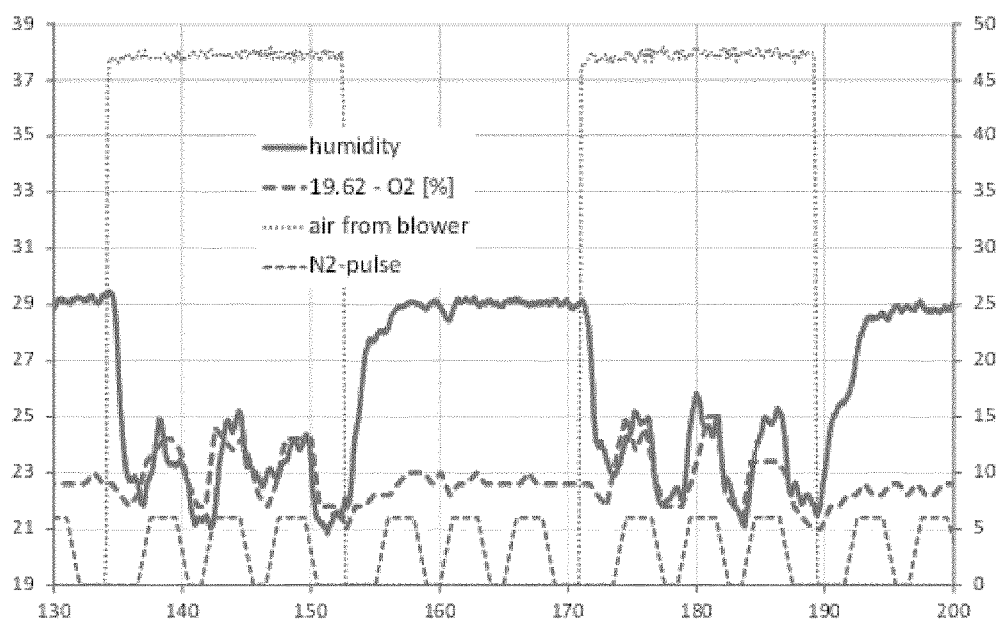
Figure 17:
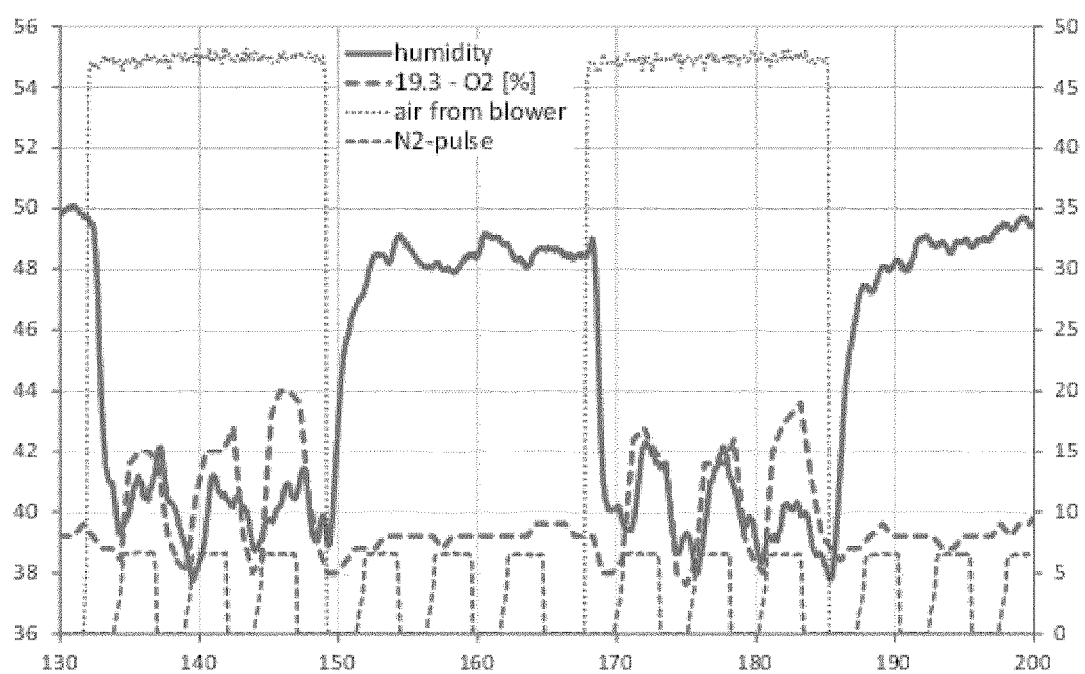

In a further experiment, the previous experiment was modified by providing a guide surface 132 extending upwardly to a height of 15 cm from the suction device 130, with the pulsed nitrogen flow being aimed at the guide surface 132. FIG. 16 depicts the experimental results without the guide surface 132 and FIG. 17 depicts the experimental results with the guide surface 132. As can be seen from these graphs, the presence of the guide surface 130 to improve the sensitivity of the suction device 130 for breathing gases such as O2, whereas it decreases the sensitivity of the suction device 130 for temperature and relative humidity, as can be expected due to the fact that the pulsed nitrogen stream is deflected by the guide surface 132. In the above experiment, the guide surface 132 was oriented perpendicular to the direction of the pulsed nitrogen stream. Similar results were obtained with the guide surface 132 oriented under non-perpendicular angles with the pulsed nitrogen stream, e.g. angles in the range of 30-60°, where the guide surface 132 was used as a deflection surface to deflect the nitrogen air stream towards the suction device 130.

The present invention may be embodied by an air purification system and operation method, a control system for such an air purification system, and/or a computer program product to be executed by such a control system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device may receive computer readable program instructions from the network and forward the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the processor of the control system, partly on the processor of the control system, as a stand-alone software package, partly on the processor of the control system and partly on a remote computer or entirely on the remote computer or server. In the latter scenario, the remote computer may be connected to the air purification system or the control system through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. The control system may be a separate entity or may be at least partially integrated in the air purification system, e.g in the air purification apparatus.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to the processor of the control system to produce a machine, such that the instructions create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:
1. An air purification system comprising:
an air purification apparatus that includes
(a) an air inlet,
(b) an air outlet for expelling air in a target direction into a region, wherein the air outlet includes an adjustment mechanism arranged to adjust said target direction in response to a target direction adjustment signal for aiming the air outlet at the face of a person in said region,
(c) at least one pollutant removal structure disposed in between the air inlet and the air outlet, and
(d) an air displacement apparatus for displacing air from the air inlet to the air outlet through the at least one pollutant removal structure;
a breathing sensor adapted to determine a breathing parameter of the person, wherein the breathing parameter comprises at least an inhalation or an exhalation phase of a breathing cycle of the person at which the air outlet is aimed, wherein the air purification apparatus is configured to expel said air via the air outlet as a function of said breathing parameter; and
a controller coupled to the air outlet and/or the air displacement apparatus, wherein responsive to the breathing parameter determined via the breathing sensor, the controller is arranged to increase an air flow rate and/or reduce the air flow rate of air expelled in the target direction, further comprising a suction device including:
a suction port arranged to capture air exhaled by the person, said suction port including (i) a suction device and (ii) at least one sensor including the breathing sensor adapted to determine the breathing parameter of the person arranged in said suction port, said at least one sensor being arranged to monitor an analyte of interest in the captured air exhaled by the person; and
a monitoring device arranged to monitor vital signs of the person from sensor data provided by the at least one sensor as the breathing parameter, wherein the air purification apparatus is configured to expel said air as a function of the vital signs monitored by said monitoring device, wherein the at least one sensor is at least one of: an $O_2$ sensor, a relative humidity sensor and a gas temperature sensor.

2. The air purification system of claim 1, wherein the controller is adapted to increase an air flow rate of the air expelled by the air outlet during a detected inhalation phase of the breathing cycle.

3. The air purification system of claim 2, further comprising a substance delivery device responsive to a trigger signal from the controller, wherein the controller is adapted to trigger a release of a substance by the substance delivery device into the air expelled via the air outlet during a detected specific phase of the breathing cycle.

4. The air purification system of claim 2, wherein the controller is adapted to increase the air flow rate produced by the air displacement apparatus and/or adjust a diameter of the air outlet during the detected inhalation phase of the breathing cycle.

5. The air purification system of claim 1, wherein the controller is arranged to trigger the generation of an air flow aimed at the person during the monitoring of the vital signs with the monitoring device.

6. The air purification system of claim 1, wherein the suction device further comprises a guide surface extending from the suction port, wherein the controller is arranged to trigger the generation of an air flow aimed at the guide surface during the monitoring of the vital signs with the monitoring device.

7. The air purification system of claim 1, wherein the orientation of the air outlet is adjustable or the orientation of the air purification apparatus is adjustable by the adjustment mechanism.

8. The air purification system of claim 1, further comprising:
a control system, wherein the control system includes:
a presence detection arrangement including an image capturing device arranged to capture an image of said region; and
a processing arrangement arranged to:
process the image captured by the image capturing device in order to recognize a face in said image and to determine a position of said face in said region; and
generate the target direction adjustment signal based on the determined position of said face in said region.

9. The air purification system of claim 8, wherein:
the image capturing device is arranged to capture a sequence of images of said region; and
the processing arrangement is arranged to update the target direction adjustment signal in accordance with a change in the position of said face in said region detected from said sequence.

10. The air purification system of claim 8, wherein the image capturing device is mounted on or near the air outlet.

11. The air purification system of claim 8, further comprising a user input device, wherein the processing arrangement is further arranged to:
systematically vary the target direction adjustment signal until receiving a user input from the user input device indicative of said air being expelled in the target direction;
trigger the image capturing device to capture an image of the region in response to the received user input;
process the image captured by the image capturing device in order to recognize a face in said image and to determine the position of said face in said region; and
correlate the target direction with the determined position.

12. A computer program product comprising a computer readable storage medium having computer readable program instructions embodied therewith for, when executed on a processing arrangement of a control system for the air purification system of claim 1, cause the processing arrangement to:
trigger an image capturing device of the control system to capture an image of a region into which the air outlet of the air purification apparatus is arranged to expel air in a target direction;
process the image captured by the image capturing device in order to recognize a face of a person in said image and to determine the position of said face in said region;
trigger a sensor to determine a breathing parameter of the person;
generate the target direction adjustment signal based on the determined position of said face in said region;
generate an air flow generation control signal based on the determined breathing parameter; and
transmit the generated target direction adjustment signal and the air flow generation control signal to the air purification apparatus for controlling the target direction of the air outlet and the expelling of clean air through the air outlet respectively.

13. The computer program product of claim 12, further comprising computer readable program instructions embodied therewith for, when executed on said processing arrangement, cause the processing arrangement to:
trigger the image capturing device to capture a sequence of images of said region; and
update the target direction adjustment signal in accordance with a change in the position of said face in said region detected from said sequence.

14. The air purification system of claim 1, wherein the controller is further adapted to define a composition of the air to be delivered to the person in response to exhaled air composition information concerning air exhaled by the person as obtained via the at least one sensor.

15. The air purification system of claim 14, wherein responsive to components in the exhaled air being indicative of halitosis or another condition that may cause breath of the user to be perceived as smelling unpleasantly, the controller is further adapted to control a release of one or more scented substances of one or more substance delivery devices to mask corresponding unpleasant smells.

* * * * *